(12) United States Patent
Wittebrood et al.

(10) Patent No.: US 6,503,640 B2
(45) Date of Patent: Jan. 7, 2003

(54) METHOD OF MANUFACTURING AN ASSEMBLY OF BRAZED DISSIMILAR METAL COMPONENTS

(75) Inventors: Adrianus Jacobus Wittebrood, Velserbroek (NL); Jacques Hubert Olga Joseph Wijenberg, Amsterdam (NL)

(73) Assignee: Corus Aluminium Walzeprodukte GmbH, Koblenz (DE)

( * ) Notice: Subject to any disclaimer, the term of this patent is extended or adjusted under 35 U.S.C. 154(b) by 0 days.

(21) Appl. No.: 09/985,945

(22) Filed: Nov. 6, 2001

(65) Prior Publication Data

US 2002/0102431 A1 Aug. 1, 2002

Related U.S. Application Data

(63) Continuation-in-part of application No. 09/573,980, filed on May 19, 2000, now Pat. No. 6,379,818.

(30) Foreign Application Priority Data

Nov. 7, 2000 (EP) .............................. 00203883

(51) Int. Cl.[7] .......................... B32B 15/20; B23K 31/02

(52) U.S. Cl. ..................... 428/654; 205/176; 205/177; 205/181; 205/185; 205/255; 205/271; 205/305; 228/219; 228/221; 228/262.1; 228/262.51; 428/646; 428/650; 428/652; 428/655; 428/656; 428/658; 428/680; 428/926; 428/935

(58) Field of Search ................................. 428/654, 646, 428/650, 652, 655, 656, 658, 680, 926, 935; 228/219, 221, 262.1, 262.15, 262.51; 205/176, 177, 181, 185, 255, 271, 305

(56) References Cited

U.S. PATENT DOCUMENTS

| | | |
|---|---|---|
| 2,821,014 A | 1/1958 | Miller |
| 3,482,305 A | 12/1969 | Dockus et al. |
| 3,597,658 A | 8/1971 | Rivera |
| 3,963,454 A | 6/1976 | Singleton, Jr. |
| 3,970,237 A | 7/1976 | Dockus |
| 4,028,200 A | 6/1977 | Dockus |
| 4,157,154 A | 6/1979 | Scott et al. |
| 4,164,454 A | 8/1979 | Schober |
| 4,388,159 A | 6/1983 | Dockus et al. |
| 4,602,731 A | 7/1986 | Dockus |
| 4,721,653 A | 1/1988 | Oda et al. |
| 5,069,980 A | 12/1991 | Namba et al. |
| 5,232,788 A | 8/1993 | Timsit et al. |
| 5,422,191 A | 6/1995 | Childree |
| 5,466,360 A | 11/1995 | Ehrsam et al. |
| 5,601,695 A | 2/1997 | Muranushi |
| 5,821,506 A | 10/1998 | Matsen |
| 6,129,262 A | 10/2000 | Cooper et al. |

FOREIGN PATENT DOCUMENTS

| | | |
|---|---|---|
| DE | 3821073 | 1/1989 |
| EP | 0227261 | 7/1987 |
| FR | 2354171 | 1/1978 |
| FR | 2617868 | 1/1989 |
| GB | 1176688 | 1/1970 |
| GB | 2182703 | 5/1987 |
| JP | 07024944 | 1/1995 |
| JP | 07144380 | 6/1995 |
| WO | 0026020 | 5/2000 |
| WO | 0071784 | 11/2000 |

OTHER PUBLICATIONS

U.S. patent application Ser. No. 09/801,840, filed Mar. 9, 2001, Adrianus Jacobus Wittebrood et al.
U.S. patent application Ser. No. 09/986,475, filed Nov. 8, 2001, Adrianus Jacobus Wittebrood.
Wernick and Pinner, "The Surface Treatment and Finishing of Aluminium and its Alloys", 5th Edition, vol. 1, pp. 181–182 and pp. 191–203 (1988) (No month given).
Wernick and Pinner, "The Surface Treatment and Finishing of Aluminium and its Alloys", 5th Edition, vol. 2, pp. 1006–1022 and pp. 1023–1071 (Ch. 14–15)(1988) (No month given).

SAE Paper No. 880446 by B.E. Cheadle and K.F. Dockus, "Inert Atmosphere Fluxless Brazing of Aluminium Heat Exchangers" ICE, Detroit, Michigan, Feb. 29–Mar. 4, 1988, pp. 1–11.

Bureau of Mines Technology, "Aluminium Soft–Soldering", 2301 N.T.I.S. Tech Notes (manufacturing), XP–002119816, 1985, Jan. No. 1G, Springfield, VA pp. 12–13.

Adrianus Jacobus Wittebrood, Jacques Hubert Olga Joseph Wijenberg, Joop Nicolaas Mooij, "Nickel–plated Aluminium Brazing Sheet", Research Disclosure, No. 439, pp. 1946–1947 (Nov. 2000).

*Primary Examiner*—Robert R. Koehler

(74) *Attorney, Agent, or Firm*—Stevens, Davis, Miller & Mosher, LLP

(57) ABSTRACT

Disclosed is a method of manufacturing an assembly of components joined by brazing, comprising the steps of:

(i) forming the components of which at least one is made from a multi-layered brazing sheet product, the multi-layered brazing sheet product comprising a core sheet (a) having on at least one surface of the core sheet an aluminium clad layer (b), the aluminium clad layer being made of an aluminium alloy comprising silicon in an amount in the range of 2 to 18% by weight, a layer (c) comprising nickel on the outer surface of the aluminium clad layer, and a layer (d) comprising zinc or tin as a bonding layer between the outer surface of the aluminium clad layer and the layer comprising nickel;

(ii) forming at least one other component of a metal dissimilar to the core sheet of the multi-layered brazing sheet product and selected from the group consisting of titanium, plated titanium, coated titanium, bronze, brass, stainless steel, plated stainless steel, coated stainless steel, low-carbon steel, plated low-carbon steel, coated low-carbon steel, high-strength steel, coated high-strength steel, and plated high-strength steel;

(iii) assembling the respective components into an assembly such that the layer (c) comprising nickel of the multi-layered brazing sheet product faces in part or in whole the at least one other component of a metal dissimilar to the core sheet of the multi-layered brazing sheet product;

(iv) brazing the assembly under a vacuum or in an inert atmosphere in the absence of a brazing-flux at elevated temperature for a period long enough for melting and spreading of the aluminium clad layer and all layers exterior thereto;

(v) cooling the brazed assembly.

The invention further relates to an assembly manufactured using the method of this invention.

28 Claims, 1 Drawing Sheet

METHOD OF MANUFACTURING AN ASSEMBLY OF BRAZED DISSIMILAR METAL COMPONENTS

CROSS-REFERENCE TO RELATED APPLICATIONS

This is a continuation-in-part, claiming priority under 35 U.S.C. Section 120, of U.S. patent appliation Ser. No. 09/573,980, filed May 19, 2000, now U.S. Pat. No. 6,379,818, incorporated herein by reference in its entirety.

FIELD OF THE INVENTION

The invention relates to a method of manufacturing an assembly of components joined by brazing, comprising the steps of forming the components of which at least two components are dissimilar to each other, assembling the components into an assembly, brazing the assembly, and cooling the brazed assembly. The invention further relates to an assembly manufactured using the method of this invention.

DESCRIPTION OF THE RELATED ART

For the purpose of this invention multi-layered brazing sheet product is to be understood as a core alloy on at least one side coupled to a clad aluminium alloy. Typical clad aluminium alloys are those of the Aluminium Association (AA)4000-series alloys and having a Si content in the range of 2 to 18% by weight, and more preferably 5 to 14% by weight. The clad aluminium alloys may be coupled to the core alloy in various ways known in the art, for example by means of roll bonding, cladding or semi-continuous or continuous casting.

Electrochemical fuel cells convert a fuel and an oxidant into electricity, water and heat. Proton Exchange Membrane Fuel Cells ("PEMFC") generally employ a membrane electrode assembly ("MEA") which comprises an ion exchange membrane or solid electrolyte disposed between two electrodes formed of porous, electrically conductive sheet material. These types of fuel cell are showing great promise for use in automotive applications as well as so-called stationary applications. There are various requirements for the metals used in a fuel cell, such as good resistance to corrosion, high strength and low manufacturing costs. Furthermore, there is a requirement of good formability. For example by means of bending, to allow for the design and manufacturing of complex shaped components. Similar requirements apply for heat-exchanger devices. As a result of these requirements various dissimilar metals may be employed in manufacturing electrochemical fuel cells. These dissimilar metals or metal alloys need to be bonded to each other in such a manner that a strong and reliable bond is obtained. A suitable method of bonding metals to each other may be brazing processes.

Brazing, by definition, employs filler metal having a liquidus temperature above 450° C. and below the solidus temperature of the base metal. Brazing is distinguished from soldering by the melting point of the filler metal: solders melt below 450° C.

Controlled Atmosphere Brazing ("CAB") and Vacuum Brazing ("VB") are the two main processes used for industrial scale brazing. VB is essentially a discontinuous process and puts high demands on material cleanliness. Traditional CAB requires an additional process step prior to brazing as compared to VB, namely a brazing flux has to be applied prior to brazing. CAB is essentially a continuous process where if the proper brazing flux is being used high volumes of brazed assemblies can be produced. To obtain good brazing results the brazing flux has to be applied on the total surface of the assembly. This can cause difficulties with traditional powder or wet fluxes, like NOCOLOK (trade mark) brazing flux, and certain type of assemblies because of their design. During the brazing cycle, corrosive fumes such as HF are generated. This puts a high demand on the corrosion resistance of the materials applied for the furnace.

Ideally, a material should be available that can be used for CAB but does not have the requirements and defects of the brazing flux application. Such a material can be supplied to a manufacturer of brazed assemblies and is ready to use directly after forming of the assembly parts. No additional brazing fluxing operations have to be carried out. Presently, only one process for fluxless brazing is used on an industrial scale. The material for this process can be for example standard brazing sheet made from an AA3000-series core alloy clad on both sides with a cladding of an AA4000-series alloy. Before the brazing sheet can be used the surface has to be modified in such a way that the naturally occurring oxide layer does not interfere during the brazing cycle. The method of achieving good brazing is to deposit a specific amount of nickel on the surface of the clad alloy. If properly applied, the nickel reacts, presumably exothermically, with the underlying aluminium. The nickel can be applied by using a shim of nickel between the two parts to be joined or can be deposited by electroplating. When electroplating is used the adherence of the nickel should be sufficient to withstand typical shaping operations being used in for example heat exchanger manufacture.

The processes for nickel-plating in an alkaline solution of aluminium brazing sheet are known from each of U.S. Pat. No. 3,970,237, U.S. Pat. No. 4,028,200, U.S. Pat. No. 4,164,454, and SAE-paper no. 880446 by B. E. Cheadle and K. F. Dockus. According to these documents, nickel or cobalt, or combinations thereof, are most preferably deposited in combination with lead. The lead addition is used to improve the wettability of the clad alloy during the brazing cycle. An important characteristic of these plating processes is that the nickel is preferentially deposited on the silicon particles of the clad alloy. To obtain sufficient nickel for brazing on the surface, the clad alloy should contain a relatively large number of silicon particles to act as nuclei for the nickel deposition. It is believed that to obtain sufficient nucleation sites before pickling a part of the aluminium in which the silicon particles are embedded should be removed by chemical and/or mechanical pretreatment. This is believed a necessary condition to obtain sufficient nickel coverage to serve as nuclei for the plating action of the brazing or clad alloy. On a microscopic scale the surface of the Si-containing cladding of the brazing sheet is covered with nickel globules.

However, the use of lead for manufacturing brazed assemblies and used in various market areas is undesirable, and it is envisaged that in the near future there might possibly even be a ban on lead comprising products or products manufactured via one or more intermediate processing steps comprising lead or lead-based components.

SUMMARY OF THE INVENTION

An object of the invention is to provide a method of manufacturing an assembly of dissimilar metal components joined by brazing, and comprising the steps of forming the components of which at least two components are dissimilar to each other and at least one of which is a multi-layered brazing sheet product, assembling the components into an assembly, brazing the assembly, and cooling the brazed assembly.

A further object of the invention is to provide a method of manufacturing an assembly of dissimilar components joined by brazing, and comprising the steps of forming the components of which at least two components are dissimilar to each and cooling the brazed assembly, and wherein one of the components is multi-layered brazing sheet which has improved formability characteristics.

A further object of the present invention is to provide a method of manufacturing an assembly of dissimilar metal components joined by brazing, where the components of at least the multi-layered brazing sheet product are lead-free.

In accordance with the invention in one aspect there is provided a method of manufacturing an assembly of components joined by brazing, comprising the steps of:

(i) forming said components of which at least one is made from a multi-layered brazing sheet product, said multi-layered brazing sheet product comprising a core sheet (a) having on at least one surface of said core sheet an aluminium clad layer (b), the aluminium clad layer being made of an aluminium alloy comprising silicon in an amount in the range of 2 to 18% by weight, preferably in the range of 5 to 14% by weight, a layer (c) comprising nickel on the outer surface of said aluminium clad layer, and a layer (d) comprising zinc or tin as a bonding layer between said outer surface of said aluminium clad layer and said layer comprising nickel;

(ii) forming at least one other component of a metal dissimilar to the core sheet of the multi-layered brazing sheet product and selected from the group consisting of titanium, plated titanium, coated titanium, bronze, brass, stainless steel, plated stainless steel, coated stainless steel, nickel, nickel alloy, low-carbon steel, plated low-carbon steel, coated low-carbon steel, high-strength steel, coated high-strength steel, and plated high-strength steel;

(iii) assembling the respective components into an assembly such that the layer (c) comprising nickel of the multi-layered brazing sheet product faces in part or in whole the at least one other component of a metal dissimilar to the core sheet of the multi-layered brazing sheet product;

(iv) brazing the assembly under a vacuum or in an inert atmosphere in the absence of a brazing-flux at elevated temperature for a period long enough for melting and spreading of the aluminium clad layer and all layers exterior thereto;

(v) cooling the brazed assembly. The cooling rate may be in the range of typical brazing furnace cooling rates. Typical cooling rates are cooling rates of at least 10° C./min or more, and preferably of 40° C./min or more.

By using the novel and improved defined multi-layer brazing sheet product an effective bond between the aluminium clad layer and the layer comprising nickel is formed, the bond remaining effective during subsequent deformation of the multi-layer brazing sheet. The component may be made out of a sheet or strip by stamping or other process steps typically used to prepare or assemble complex structure such as cans, prismatic can, containers, cells, or other parts typically used to design and manufacture for example heat exchangers or fuel cells. The improved capability for deforming allows for the design of more complex designed assemblies joined by brazing. Furthermore, manufacturing of the multi-layer brazing sheet product may be carried out in a continuous process. The product is ideally suitable for fluxless brazing under controlled atmosphere conditions to produce assemblies of dissimilar metal components.

The method allows for the design and manufacture of brazed assemblies in which, for example a component being made of titanium or plated or coated titanium, e.g. copper-plated titanium, is bonded by means of brazing to one side of the multi-layered brazing sheet component having on both sides a layer (c) comprising nickel, which layer may be kept essentially lead-free, and whereby on the other side of the multi-layered brazing sheet a component being made of plated or coated stainless steel or aluminium is bonded by means of brazing. The bonding achieved by means of brazing is reliable and has sufficient strength.

The invention is based in part on the insight that to obtain a well-bonded nickel layer on the Si-containing clad layer of the brazing sheet product so that the bond remains effective under large deformation, pre-treatment of the clad layer is extremely important. The prior art processes apparently aimed at applying the nickel in a distributed form, principally on the silicon particles at the surface of the clad layer, rather than trying to achieve a uniform nickel layer. In the present invention the surface of the Si-containing clad alloy is altered in such way that the nickel coverage is independent of the silicon particles at its surface. The nickel plating does not take place on the silicon particles but on the applied layer comprising zinc or tin. Since the nickel thus is deposited on the total surface of the clad layer the necessary reaction before brazing can take place much more easily as compared to the process of the prior art. The zinc or tin applied does not interfere at all during the brazing process, and may contain a component to assist the brazing, as described below. Since the nickel is deposited smoothly and uniformly on the surface, the use of lead to promote wetting during brazing can be reduced or avoided, or other elements such as bismuth may be used for this purpose. A further important advantage of the nickel deposited smoothly and uniformly on the surface is that the total amount of nickel to be applied in order to achieve good flux-less brazing can be reduced. Another advantage is that the complete surface coverage avoids any difficulty caused by aluminium oxide at the surface of the clad layer.

Preferably the aluminium clad layer has discrete silicon-rich particles exposed at the outer surface thereof, and the layer comprising nickel is bonded to the silicon-rich particles and to the areas of the outer surface between the silicon-rich particles, so as to form a continuous layer on the outer surface.

In dependence on the composition of the core sheet the process may further include the further processing step of ageing at ambient or elevated temperature of the brazed and cooled assembly in order to optimise the mechanical and/or corrosion properties of the resultant assembly.

Very good results may be obtained with a direct zinc-plating treatment. Alternatively very good results may be obtained with an immersion zincate treatment or immersion stannate treatment, often also referred to as displacement plating. A further advantage is that this treatment lends itself to application in a continuous process operation. Preferably the duration of the zincate treatment or stannate treatment is in the range of 1 to 300 seconds. Preferably the temperature of the bath during the zincate treatment or stannate treatment is in the range of 10 to 50° C., and more preferably in the range of 15 to 30° C.

In an embodiment of the method according to the invention in the multi-layer brazing sheet the applied layer (d) (see FIG. 2) comprising zinc or tin has a thickness up to 0.5 μm, more preferably up to 0.3 μm (300 nm), and most preferably in the range of 0.01 to 0.15 μm (10–150 nm). In the best results obtained a thickness of about 30 nm has been used. A coating thickness of greater than 0.5 μm requires a prolonged treatment time, e.g. for displacement plating, and is thought to have no further advantages for improving the adhesion.

The zinc or tin layer applied in the multi-layer brazing sheet product used in the method according to this invention may be essentially a pure zinc or tin layer or may be primarily zinc or tin (e.g. at least 50 weight %). Deliberately added elements may be present, such as for example bismuth in a range of up to 10% to improve the wetability action during subsequent brazing operations. Typically impurity elements are present at less than 5% by weight in the zinc or tin layer.

In accordance with the invention in another aspect there is provided a method of manufacturing an assembly of brazed components, comprising the steps of:

(i) forming the components of which at least one is made from a multi-layered brazing sheet product, the multi-layered brazing sheet product comprising a core sheet (a) having on at least one surface of the core sheet an aluminium clad layer (b), the aluminium clad layer being made of an aluminium alloy comprising silicon in an amount in the range of 2 to 18% by weight, preferably in the range of 5 to 14% by weight, and a layer (c) on the outer surface of the aluminium clad layer, the layer (c) comprising nickel and further at least bismuth in a range of up to 5% by weight;

(ii) forming at least one other component of metal dissimilar to the core sheet of the multi-layered brazing sheet product and selected from the group consisting of titanium, plated titanium, coated titanium, bronze, brass, stainless steel, plated stainless steel, coated stainless steel, nickel, nickel alloy, low-carbon steel, plated low-carbon steel, coated low-carbon steel, high-strength steel, coated high-strength steel, and plated high-strength steel;

(iii) assembling the respective components into an assembly such that the layer (c) comprising nickel of the multi-layered brazing sheet product faces in part or in whole the at least one other component of a metal dissimilar to the core sheet of the multi-layered brazing sheet product;

(iv) brazing the assembly under a vacuum or in an inert atmosphere in the absence of a brazing-flux at elevated temperature for a period long enough for melting and spreading of the aluminium clad layer and all layers exterior thereto (in other words, all layers between the melted aluminium clad layer and the other component);

(v) cooling the brazed assembly. The cooling rate may be in the range of typical brazing furnace cooling rates. Typical cooling rates are cooling rates of at least 10° C./min or more, and preferably of 40° C./min or more.

In accordance with the invention it has been found surprisingly that the nickel layer does not need to comprise any lead as a mandatory alloying addition in order to achieve good brazeability of the dissimilar metal components. Surprisingly it has been found that equal or even better results can be obtained if bismuth is added to the nickel layer, such that the nickel layer can be kept lead-free. If the nickel layer is applied by plating also the plating bath used for the deposition of this Ni—Bi layer can be kept free from any lead-containing components. By using this aqueous plating bath the need for the addition of lead has been overcome, which is a significant achievement from an environmental point of view.

The method allows for the design and manufacture of brazed assemblies in which, for example a component being made of titanium or plated or coated titanium, e.g. copper-plated titanium, is joined by means of brazing to one side of the multi-layered brazing sheet product component comprising on both sides a layer (c) comprising nickel, which layer may be kept essentially lead-free, and whereby on the other side of the multi-layered brazing sheet a component being made of plated or coated stainless steel or aluminium is joined by means of brazing. The joining achieved by means of brazing is reliable and has sufficient strength.

In an embodiment of the methods according to the invention is characterised in that the layer (c) comprising nickel, further at least comprises bismuth in a range of up to 3% by weight, preferably up to 1% by weight, and more preferably in a range of 0.01 to 0.05% by weight.

In an embodiment of the methods according to this invention in the multi-layer brazing sheet product used in the method according to this invention the layer comprising nickel has a thickness up to 2.0μm, preferably up to 1.0 μm, and more preferably up to 0.5 μm. A coating thickness of greater than 2.0 μm requires a prolonged treatment time for plating, and may result in wrinkling of the molten filler material during brazing. A preferred minimum thickness for this Ni-containing layer is 0.3 μm. However, other techniques such as thermal spraying, plasma spraying, Chemical Vapor Deposition ("CVD") and Physical Vapor Deposition ("PVD") or other known techniques for depositing of metals or metal alloys from a gas or vapor phase may be used.

In an embodiment of the methods according to the invention of the multi-layer brazing sheet product the layer (c) comprising nickel is deposited by electroplating both nickel and bismuth using a lead-free aqueous bath comprising a nickel-ion concentration in the range of 10 to 100 g/l and a bismuth-ion concentration in the range of 0.01 to 10 g/l. It has been found that both nickel and bismuth may be electroplated simultaneously from one bath, allowing for an economical production of multi-layer brazing sheet product which can withstand high degrees of forming.

In a further embodiment the methods according to the invention are characterised in that of the multi-layered brazing sheet product the layer comprising nickel is being deposited by plating both nickel and bismuth using a lead-free aqueous bath comprising a nickel-ion concentration in a range of 20 to 70 g/l and a bismuth-ion concentration in the range of 0.02 to 5 g/l.

The nickel-ion concentration to the aqueous bath can be added via the addition of nickel chloride, nickel fluoborate, nickel sulfamate, nickel acetate or nickel sulphate. However, there is a preference to use the addition of nickel sulphate (NiSO$_4$). At a too high level of nickel salt in the aqueous bath there is the risk of the crystallization of the salt in the solution, which might damage a continuous process. At too low levels the resultant bath becomes uneconomical due to too long plating times and low current density.

The aluminium clad layer may be coupled to the core sheet of the multi-layered brazing sheet by means of roll bonding, spray forming, semi-continuous casting or continuous casting processes.

In an embodiment of the methods according to the invention the aluminium clad layer (c) (see FIG. 2) is of an AA4000-series aluminium alloy which comprises Si in a range of 2 to 18% by weight, and preferably 5 to 14%, and further at least Mg in a range of up to 8% by weight, and preferably up to 5% by weight, and more preferably in a range of 0.05 to 2.5% by weight.

In a further embodiment of the methods according to this invention the aluminium clad layer (c) comprises, in weight percent:

| Si | 2 to 18, preferably 5 to 14 |
|---|---|
| Mg | up to 8.0, preferably up to 5.0 |
| Zn | up to 5.0 |
| Cu | up to 5.0 |
| Mn | up to 0.50 |
| In | up to 0.30 |
| Fe | up to 0.8 |
| Sr | up to 0.20 | and at least one element selected from the group consisting of:

| Bi | 0.01 to 1.0 |
|---|---|
| Li | 0.01 to 1.0 |
| Sb | 0.01 to 1.0 | impurities each up to 0.05, total up to 0.20 balance aluminium.

This aspect of the invention is based on the insight that the aluminium clad layer may comprise one or more elements selected from the group consisting of bismuth, lead, lithium and antimony, each in a range of 0.01 to 1.0%, and magnesium in a range of 0.2 to 2.0%, and the combination of two or more elements does preferably not exceed 2.5%. In accordance with the invention it has been found surprisingly that the nickel layer itself does not need to comprise any lead as a mandatory alloying addition. Surprisingly it has been found that an equal or even better results can be obtained if one or more elements of the group Bi, Li, Sb and Mg is being added in the given ranges to the aluminium clad layer itself. The addition of lead to the aluminium clad layer is very effective, however, its addition from an environmentally point of point is to be avoided. Further alloying elements may be added to improve specific properties of the aluminium alloy clad layer. Magnesium may be present in the clad layer in a range of up to 8.0%, and preferably in a range of 0.2 to 5.0%, and more preferably 0.5 to 2.5%, as an alloying element to increase amongst others the strength of the aluminium clad layer. In accordance with the invention it has been found also that magnesium in the range of 0.2 to 2.0% may also act in a similar way as elements selected from the group of bismuth, lithium and antimony. Preferably the magnesium level in the aluminium clad layer does not exceed 2.0%, when it is present essentially only to promote the wetting action of the aluminium clad alloy in combination with the lead-free nickel layer. In case magnesium in the clad layer is present in an amount of more than 2.0% it is preferably accompanied with one or more elements selected from the group consisting of bismuth, lithium and antimony in the given ranges, and whereby the combination of two or more elements from this group does preferably not exceed 1.0%. It has been found also that in use of the multi-layer brazing sheet the presence of magnesium in the aluminium clad layer has no detrimental effects during brazing. This is a major improvement over known multi-layered brazing sheet products. It allows that Mg-containing multi-layered brazing sheet products may be applied in both VB and fluxless CAB. The latter possibility has many economical and technical advantages.

The core sheet may be coupled to the aluminium clad layer via one or more intermediate layer or layers, which may be another aluminium alloy, copper or copper alloy, zinc or zinc alloy.

The core sheet of the brazing sheet product on which multiple metal layers are being coupled are preferably of aluminium alloys, for example of the Aluminium Association (AA)3000, (AA)6000 or (AA)5000-series, but may also be titanium, bronze, brass, copper, high-strength steel, low-carbon steel or stainless steel. Some examples of stainless steels are as follows: Stainless steel grades with 0.01 to 0.35% by weight of carbon and 11 to 27% by weight of Cr, as defined by the international steel numbers, like Ferritic grades, for example ASTM 409, 410S, 430; Martensitic grades, for example ASTM 420; Duplex grades, for example ASTM 329, S31803; Austenitic grades, for example ASTM 301, 304L, 321, 316L; and heat and creep resisting grades, for example ASTM 309S, 304H. High-strength steel typically has yield strengths in the range of 550 to 1100 MPa, tensile strength in the range of 585 to 1170 MPa, and an elongation in the range of 1 to 8%. This clarification of suitable non-aluminium materials applies also for the choice set forth in the claims and the description for the at least one other component of a metal dissimilar to the core sheet of the multi-layered brazing sheet product.

The core sheet has a thickness typically in a range of at most 5 mm, more preferably in the range of 0.2 to 2 mm.

The invention further provides an assembly joined by brazing and manufactured in accordance with the invention described above. In its preferred embodiments the brazed assembly is a heat-exchanger, typically for automotive applications, or a fuel-cell, ideally a proton exchange membrane fuel cell.

In a further aspect of the invention there is provided a method of use of the multi-layered brazing sheet set out above in a method of manufacturing an assembly joined by brazing, preferably in an inert atmosphere brazing (CAB) process in the absence of a brazing-flux material.

BRIEF DESCRIPTION OF THE DRAWINGS

The invention will now be illustrated by several non-limitative examples, and with reference to the drawings, wherein:

FIG. 1 shows schematically a brazing sheet product in accordance with the prior art as would be obtained by the process in accordance with for example U.S. Pat. No. 3,970,237. The brazing sheet product consists of a core sheet (a) on one or both sides clad with an aluminium clad layer (b) comprising an Al—Si alloy. On top of the clad layer (b) a thin nickel-lead layer (c) is applied by means of electro-plating.

FIG. 2 shows schematically a brazing sheet product used in accordance with the invention for manufacturing an assembly of components joined by brazing, whereby at least two components are dissimilar to each other. The brazing sheet product comprises a core sheet (a) on one or both sides clad with an aluminium alloy clad layer (b) comprising silicon in an amount of 2 to 18% by weight, and typically a AA4000-series aluminium alloy, a layer (c) comprising nickel or nickel-bismuth on the outer surface of the aluminium clad layer (b), and a bonding layer (d) comprising zinc or tin between the layers (b) and (c). In FIG. 2 the layers (c) and (d) have been shown on only one side of the brazing sheet product, but it will be immediately apparent to the skilled person that they may also be applied on both sides of the brazing sheet product. Furthermore it will be immediately apparent to the skilled person that on top of the layer (c) comprising nickel or nickel-bismuth further metal layers may be applied to improve on other characteristics of the brazing sheet product, such as, but not limited thereto, improvement of corrosion characteristics. The composition and the thickness of the various layers and their advantages have been set out above.

EXAMPLES

Example 1

Figure 1:
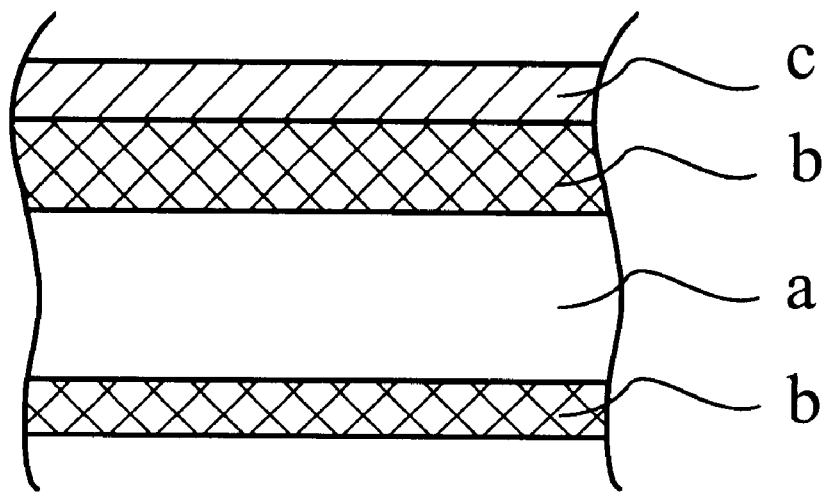
FIG. 1 is a schematic longitudinal section showing the structure of brazing sheet product according to the state of the art.
Figure 2:
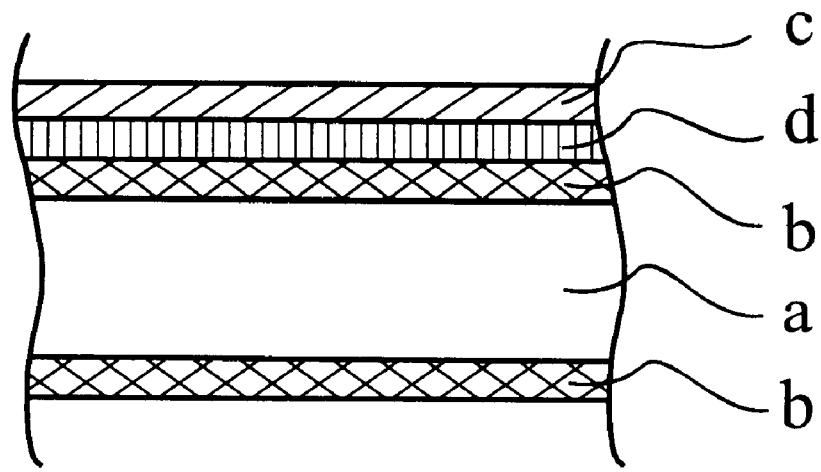
FIG. 2 is a schematic longitudinal section showing the structure of aluminium brazing sheet product according to the invention.

On a laboratory scale tests have been carried out on aluminium brazing sheet product manufactured from an AA3003-series aluminium core alloy roll clad on both sides with an AA4045-series aluminium clad alloy. The product had a total thickness of 0.5 mm, and the thickness of each clad being 10.9% of the total thickness. The composition, in weight percent, of these alloys is given in Table 1.

TABLE 1

|  | AA 3003 | AA 4045 |
|---|---|---|
| Si | 0.6 max. | 9.0–11.0 |
| Fe | 0.7 max. | 0.8 max. |
| Cu | 0.05–0.20 | 0.30 max. |
| Mn | 1.0–1.5 | 0.05 max. |
| Mg | — | 0.05 max. |
| Zn | 0.10 max. | 0.10 max. |
| Ti | — | 0.20 max. |
| impurities | each 0.05 total 0.15 | each 0.05 total 0.15 |
| balance | aluminium | aluminium |

Each sample was treated by the following sequential process steps (see also Table 2), cleaning by immersion for 180 sec. in ChemTec (trade name) 30014 (a commercial alkaline (etch) degreaser), and rinsing, alkaline etching for 20 sec. in ChemTec (trade name) 30203 (a commercial available alkaline etch cleaner), and rinsing, optionally desmutting for 4 sec. in an acidic oxidizing solution, typically 25–50 vol. % nitric acid, comprising ChemTec (trade name) 11093 (a commercial available pickle activator) at ambient temperature, followed by rinsing, optionally zincate immersion using ChemTec (trade name) 024202 for 12 sec. at room temperature, followed by rinsing, nickel electroplating, and rinsing.

For the nickel electroplating two different types of solutions were used, a basic bath and an acid bath, see also Table 2.

The acid bath comprised 270 g/l nickel sulphate, 50 g/l nickel chloride, 30 g/l boric acid. The plating conditions at 50° C. were such that a nickel layer of 2.0 μm is present after the plating process using a current density of 5 A/dm². This acid bath is also known as the Watt's process.

The basic bath comprised 50 g/l nickel sulphate, 50 g/l nickel chloride, 100 g/l sodium citrate, 1 g/l lead acetate, and 75 ml/l ammonium hydroxide (30%). The plating conditions at 26° C. were such that a plating time of 50 seconds resulted in a nickel-lead plated layer of 0.5 μm thickness using a current density of 3 A/dm², and a plating time of 200 seconds resulted in a nickel-lead plated layer of 2.0 μm thickness.

The multi-layered brazing sheet specimens have been tested for adhesion using the Erichsen dome test (5 mm), and the T-bend test. A value assessment is then given to the adhesion where: (−)=poor, (±)=fair, and (+)=good. The morphology of the nickel layer applied has been investigated using SEM/EDX, where: U=uniform nickel layer (shiny appearance), and (G)=nickel globules preferentially deposited on the silicon particles (dull appearance).

Furthermore, the brazeability has been assessed. On a laboratory scale of testing the brazing tests were carried out in a small quartz furnace. Small coupons of 25×25 mm were cut from the multi-layered brazing sheets. A small strip of an AA3003 alloy measuring 30×7×1 mm was bent in the center to an angle of 45° and laid on the coupons. The strip-on-the-coupon samples were heated under flowing nitrogen, with heating from room temperature to 580° C., dwell time at 580° C. for 1 minute, cooling from 580° C. to room temperature. The brazing process was judged on possible formation of wrinkles, capillary depression and fillet formation. An overall assessment was given where: (−)=poor brazeability, (−/±)=fair brazeability, (±)=good brazeability, and (+)=excellent brazeability. The results obtained are summarized in Table 2.

From the results of Table 2 it can been seen that in case of a zinc immersion pre-treatment step, a uniform nickel or nickel-lead layer is obtained having a shiny appearance. Further it can be seen that a zinc immersion pre-treatment is required to obtain a good adhesion of the electroplated nickel layer allowing to prepare or assemble complex structure such as cans, prismatic can, containers, cells, or other parts typically used to design and manufacture for example heat exchangers or fuel cells. Further it can be seen that a nickel-lead layer of 0.5 μm has better brazeability characteristics than a layer of 2.0 μm thickness; in the latter case wrinkles have been observed. The brazeability of the material obtained via the basic bath route has better brazeability characteristics (but still acceptable) than material obtained via the acid bath route, possibly due to the presence of lead in the electroplated layer.

In addition, the brazeability has been assessed by bringing multi-layered brazing sheet products into contact with strips of the following dissimilar metals: copper plated stainless steel (AA304 grade), copper plated low-carbon steel (0.15 max. weight % C, and 1.65 max. weight. % Mn), brass (70% copper, 30% zinc), 100% copper sheet and titanium 5.4 l. On a laboratory scale the brazing tests were carried out in a small quartz furnace. Small coupons of 25×25 mm were cut from multi-layered aluminium brazing sheet product obtained via a process comprising the zincate immersion treatment set out above and the nickel layer obtained via the basic bath comprised 50 g/l nickel sulphate, 50 g/l nickel chloride, 100 g/l sodium citrate, 1 g/l lead acetate, and 75 ml/l ammonium hydroxide (30%), and the plating conditions at 26° C. were such that a plating time of 50 sec. resulted in a nickel-lead plated layer of 0.5 μm thickness using a current density of 3 A/dm². A small strip of the dissimilar metal sheet measuring 30×7×1 mm was bent in the center to an angle of 45° and laid on the coupons. No external force was used. The dissimilar metal strip on the coupon samples were heated under flowing nitrogen, with heating from room temperature to 580° C., dwell time at 580° C. for 1 minute, cooling from 580° C. to room temperature. Joining was considered to have taken place when a fillet was formed between the aluminium alloy and the dissimilar metal to be joined. In all of the described examples a fillet was formed indicating a positive wetting action of the molten aluminium clad alloy and the nickel comprising layer during the braze cycle. The core did not melt during the braze cycle.

For comparison multi-layered brazing sheets having no layer comprising nickel have been brought into contact with strips of the following dissimilar metals: copper plated stainless steel (AA304 grade), copper plated low-carbon steel (0.15 max. weight. % C, and 1.65 max. weight. % Mn), brass (70% copper, 30% zinc), 100% copper sheet and titanium 5.4 l., and subjected to the same brazing cycle as set out above. The brazed samples showed little or no wetting with the metals to be joined by brazing.

TABLE 2

Experimental conditions and results.

| Plating bath | acid | acid | acid | basic | basic | basic | basic |
|---|---|---|---|---|---|---|---|
| Desmutting [s] | 4 | 4 | – | 4 | – | 4 | – |
| Zinc immersion time [s] | – | 12 | 12 | – | 12 | 12 | 12 |
| Nickel plating time [s] | 120 | 120 | 120 | 200 | 200 | 50 | 50 |
| Adhesion | – | + | + | – | + | + | + |
| Brazeability | –/± | –/± | –/± | ± | ± | + | + |
| Morphology | G | U | U | G | U | U | U |

Example 2

Analogous to Example 1, multi-layered brazing sheet products have been prepared and subsequently brazed to: copper plated stainless steel (AA304 grade), copper plated low-carbon steel (0.15 max. weight. % C, and 1.65 max. weight. % Mn), brass (70% copper, 30% zinc), 100% copper sheet and titanium 5.4 l. However, the nickel comprising layer has been applied using a different manner, namely by using a nickel plating bath having a composition as set out in Table 3 and having a pH of 5.5. The Bi-ion concentration has been added to the plating bath using a Bi-ion concentrate of 160 g/l sodium hydroxide, 300 g/l sodium gluconate and 111 g/l bismuth oxide. The electroplating of a Ni—Bi layer was performed at 57° C. using a current density of 6 A/dm$^2$ and a plating time of 25 sec. About 10 g/m$^2$ of nickel was deposited and about 0.5 g/m$^2$ bismuth, being the sum of the applied layers on both sides on the brazing sheet product. The bismuth content of the deposited alloy layer can easily be varied, e.g. by lowering the bismuth concentration in the plating bath, to give a lower Bi content.

Also in this experiment a fillet was formed in all examples indicating a positive wetting action of the molten aluminium clad alloy and all layers exterior thereto during the braze cycle. Furthermore, this example shows how an electroplated nickel layer containing bismuth, but comprising no lead, may be applied, resulting in a product having a good adhesion of the nickel layer and excellent brazeability for the dissimilar metal components.

TABLE 3

| Compound | Concentration [g/l] |
|---|---|
| Nickel sulphate | 142 |
| Ammonium sulphate | 34 |
| Nickel chloride | 30 |
| Sodium citrate | 140 |
| Sodium gluconate | 30 |
| Bismuth ions | 1 |

This lead-free plating bath has many advantages compared to the standard known lead-containing baths: no ammonia fumes, more practical operating temperatures, typically 40 to 70° C., high current density, bismuth can easily be replenished to the plating bath, and further, standard chemicals can be employed.

Having now described the invention, it will be apparent to one of ordinary skill in the art that many changes and modifications can be made without departing from the spirit or scope of the invention as herein described. The present invention is defined by the claims appended hereto.

What is claimed is:

1. A method of manufacturing an assembly of components joined by brazing, comprising the steps of:
    (i) forming said components of which at least one is made from a multi-layered brazing sheet product, the multi-layered brazing sheet product comprising a core sheet (a) having on at least one surface of said core sheet (a) an aluminium clad layer (b), the aluminium clad layer (b) being made of an aluminium alloy comprising silicon in an amount in the range of 2 to 18% by weight, a layer (c) comprising nickel on an outer surface of said aluminium clad layer, and a layer (d) comprising zinc or tin as a bonding layer between said outer surface of said aluminium clad layer (b) and said layer (c) comprising nickel;
    (ii) forming at least one other component of a metal dissimilar to the core sheet of the multi-layered brazing sheet product and selected from the group consisting of titanium, plated titanium, coated titanium, bronze, brass, stainless steel, plated stainless steel, coated stainless steel, nickel, nickel alloy, low-carbon steel, plated low-carbon steel, coated low-carbon steel, high-strength steel, coated high-strength steel, and plated high-strength steel;
    (iii) assembling the respective components into an assembly such that the layer (c) comprising nickel of the multi-layered brazing sheet product faces in part or in whole the at least one other component of a metal dissimilar to the core sheet of the multi-layered brazing sheet product;
    (iv) brazing the assembly under a vacuum or in an inert atmosphere in the absence of a brazing-flux at elevated temperature for a period long enough for melting and spreading of the aluminium clad layer (b) and all layers exterior thereto;
    (v) cooling the brazed assembly.

2. The method according to claim 1, wherein said aluminium clad layer (b) has discrete silicon-rich particles exposed at said outer surface thereof, and said layer comprising nickel is bonded to said silicon-rich particles and to the areas of said outer surface between said silicon-rich particles, so as to form a continuous layer on said outer surface.

3. The method according to claim 1, wherein said bonding layer (d) is applied by a direct zinc-plating treatment or a zincate treatment or a stannate treatment.

4. The method according to claim 3, wherein said bonding layer (d) is applied by an immersion zincate treatment or an immersion stannate treatment.

5. The method according to claim 1, wherein said bonding layer (d) has a thickness of not more than 0.5 μm.

6. The method according to claim 5, wherein said bonding layer (d) has a thickness in the range of 20 to 150 nm.

7. The method according to claim 1, wherein the layer (c) comprising nickel further comprises bismuth in a range of at most 5% by weight.

8. Method of manufacturing an assembly of components joined by brazing, comprising the steps of:
    (i) forming said components of which at least one is made from a multi-layered brazing sheet product, the multi-layered brazing sheet product comprising a core sheet (a) having on at least one surface of said core sheet an aluminium clad layer (b), the aluminium clad layer being made of an aluminium alloy comprising silicon in an amount in the range of 2 to 18% by weight, and a layer (c) on the outer surface of said aluminium clad layer, the layer (c) comprising nickel and further at least bismuth in a range of at most 5% by weight;

(ii) forming at least one other component of a metal dissimilar to the core sheet of the multi-layered brazing sheet product and selected from the group consisting of titanium, plated titanium, coated titanium, bronze, brass, stainless steel, plated stainless steel, coated stainless steel, nickel, nickel alloy, low-carbon steel, plated low-carbon steel, coated low-carbon steel, high-strength steel, coated high-strength steel, and plated high-strength steel;

(iii) assembling the respective components into an assembly such that the layer (c) comprising nickel of the multi-layered brazing sheet faces in part or in whole the at least one other component of a metal dissimilar to the core sheet of the multi-layered brazing sheet product;

(iv) brazing the assembly under a vacuum or in an inert atmosphere in the absence of a brazing-flux at elevated temperature for a period long enough for melting and spreading of the aluminium clad layer (b) and all layers exterior thereto;

(v) cooling the brazed assembly.

9. The method according to claim 1, wherein said layer (c) comprising nickel is applied by electroplating.

10. The method according to claim 1, wherein said layer (c) comprising nickel, further comprises bismuth in a range of up to 3% by weight.

11. The method according to claim 1, wherein said layer (c) comprising nickel has a thickness of not more than 2.0 $\mu$m.

12. The method according to claim 1, wherein said layer (c) comprising nickel is deposited by electroplating both nickel and bismuth using an aqueous bath comprising a nickel-ion concentration in the range of 10 to 100 g/l and a bismuth-ion concentration in the range of 0.01 to 10 g/l.

13. The method according to claim 1, wherein the layer (c) comprising nickel is essentially lead-free.

14. The method according to claim 1, wherein the core sheet (a) of the multi-layered brazing sheet product is of an aluminium alloy.

15. The method according to claim 14, wherein the core sheet (a) of the multi-layered brazing sheet product is of an aluminium alloy selected from the group consisting of AA3000, AA5000, and AA6000-series aluminium alloys.

16. The method according to claim 1, wherein said bonding layer (d) has a thickness of not more than 0.3 $\mu$m.

17. The method according to claim 1, wherein said layer (c) comprising nickel, also comprises nickel and bismuth, and is applied by electroplating.

18. The method according to claim 1, wherein said layer (c) comprising nickel, further comprises bismuth in a range of up to 1% by weight.

19. The method according to claim 1, wherein said layer (c) comprising nickel, further comprises bismuth in a range of 0.01 to 0.05% by weight.

20. The method according to claim 1, wherein said layer (c) comprising nickel has a thickness of not more than 1.0 $\mu$m.

21. An assembly of components joined by brazing manufactured by the method according to claim 1.

22. An assembly according to claim 21, wherein the assembly is an automotive heat exchanger.

23. An assembly according to claim 21, wherein the assembly is a fuel cell.

24. An assembly according to claim 21, wherein the assembly is a proton exchange membrane fuel cell.

25. An assembly of components joined by brazing manufactured by the method according to claim 8.

26. An assembly according to claim 25, wherein the assembly is an automotive heat exchanger.

27. An assembly according to claim 25, wherein the assembly is a fuel cell.

28. An assembly according to claim 25, wherein the assembly is a proton exchange membrane fuel cell.

* * * * *

UNITED STATES PATENT AND TRADEMARK OFFICE
CERTIFICATE OF CORRECTION

PATENT NO. : 6,503,640 B2  
DATED : January 7, 2003  
INVENTOR(S) : Adrianus Jacobus Wittebrood et al.

It is certified that error appears in the above-identified patent and that said Letters Patent is hereby corrected as shown below:

<u>Title page,</u>  
Item [73], the name of the Assignee is -- Corus Aluminium Walzprodukte GmbH. --

Signed and Sealed this

Twenty-ninth Day of April, 2003

JAMES E. ROGAN  
*Director of the United States Patent and Trademark Office*